(12) United States Patent
Lakatos et al.

(10) Patent No.: US 9,650,081 B2
(45) Date of Patent: May 16, 2017

(54) FRONT END MODULE FASCIA RETENTION HOOK

(71) Applicant: FORD GLOBAL TECHNOLOGIES, LLC, Dearborn, MI (US)

(72) Inventors: Steven Michael Lakatos, Waterford, MI (US); Jeffery Lee, Windsor (CA)

(73) Assignee: Ford Global Technologies LLC, Dearborn, MI (US)

(*) Notice: Subject to any disclaimer, the term of this patent is extended or adjusted under 35 U.S.C. 154(b) by 64 days.

(21) Appl. No.: 14/669,215

(22) Filed: Mar. 26, 2015

(65) Prior Publication Data
US 2016/0280276 A1  Sep. 29, 2016

(51) Int. Cl.
*B60R 13/00* (2006.01)
*B62D 25/08* (2006.01)
*B60R 19/52* (2006.01)
*F16B 5/06* (2006.01)

(52) U.S. Cl.
CPC .......... *B62D 25/085* (2013.01); *B60R 13/00* (2013.01); *B60R 19/52* (2013.01); *F16B 5/06* (2013.01)

(58) Field of Classification Search
CPC ........ B62D 27/06; B62D 25/085; B60R 19/52
USPC ..................................... 296/193.1
See application file for complete search history.

(56) References Cited

U.S. PATENT DOCUMENTS

| | | | |
|---|---|---|---|
| 5,347,690 A | 9/1994 | Mansoor et al. | |
| 6,422,643 B1 | 7/2002 | Pease | |
| 6,824,201 B2* | 11/2004 | Miyazaki | B60R 13/0206 296/1.08 |
| 7,073,849 B1 | 7/2006 | Nunes | |
| 7,644,975 B2* | 1/2010 | Ryan | B60R 13/04 296/1.08 |
| 7,758,106 B2 | 7/2010 | Glickman et al. | |
| 7,896,409 B2* | 3/2011 | Abdelnour | B60R 19/52 296/193.1 |
| 8,615,962 B1* | 12/2013 | Perez | B60R 13/0206 296/1.08 |

(Continued)

FOREIGN PATENT DOCUMENTS

JP   2003175786   6/2003
WO  2013189064 A1  12/2013

OTHER PUBLICATIONS

English machine translation of JP2003175786.

*Primary Examiner* — Jason S Morrow
(74) *Attorney, Agent, or Firm* — Jason Rogers; King & Schickli PLLC

(57) ABSTRACT

A fastener for securing a first vehicle module to a second vehicle module includes a head having a substantially vertical capturing surface configured for releasably engaging a portion of the second vehicle module, a body having a base configured for attachment to a back of the first vehicle module and a neck extending between the base and the head. The neck includes at least one reinforcing rib structure. The head defines a hook portion including the capturing surface configured for releasably engaging a cooperating flange disposed on the second vehicle module. The hook portion further includes a cam surface configured for slidingly translating over the cooperating flange, the capturing surface and the cam surface meeting at an acute angle. In embodiments, the fastener is used to variably secure a vehicle grille assembly to a vehicle front end module bolster.

15 Claims, 4 Drawing Sheets

(56) References Cited

U.S. PATENT DOCUMENTS

2008/0317549 A1    12/2008  Matthews et al.
2013/0278001 A1*   10/2013  Zimmerman ....... B60R 13/0256
                                                    296/1.08
2015/0274217 A1*   10/2015  Colombo .............. F16B 5/0628
                                                    403/14

* cited by examiner

FRONT END MODULE FASCIA RETENTION HOOK

TECHNICAL FIELD

This disclosure relates generally to fasteners for motor vehicle components, and more particularly to an improved fastener for releasably engaging vehicle components such as a grille assembly and a front end module bolster.

BACKGROUND

It is an industry practice to assemble various components into assemblies in modular form. The modules are then connected one to another in the latter stages of vehicle assembly. A wide variety of fasteners are used to secure vehicle modules, components and assemblies one to another. Often, "hard" fasteners such as bolts, screws, rivets, clamps, and others are used to provide secure attachments, and also attachments providing flush mating surfaces for reasons of safety and aesthetics. In other areas so-called hard fasteners cannot be used or packaged. In such areas, however, it is still a requirement to provide a flush mating surface between the attached components, for reasons of safety and also consumer preference/aesthetics. A non-flush or partially mismatched mating surface between vehicle components or assemblies, while perfectly safe, may be perceived by a consumer as indicative of poor quality and so rejected.

As one non-limiting example, various components of a vehicle closest to the radiator are typically packaged into an assembly commonly called a front-end module. The front-end module includes a frame structure commonly referred to as a bolster. Likewise, the components of the vehicle front grille are provided as a grille assembly, which comprises many components provided as a large molded piece that must be connected to the front-end module bolster. Many prior art assemblies used hard fasteners such as threaded screws, threaded bolts, etc. to provide this connection due to strength requirements, i.e. the need to provide a connection that is not easily broken and that will not shift, rub, or squeak during vehicle operation. However, such hard fasteners add time to the process of assembling a vehicle.

Moreover, it is desirable to provide a hidden connection between the grille assembly and the front-end module bolster, to present a more seamless appearance to the finished vehicle front. This often is not possible with conventional hard fasteners. Also, during the assembly process, unfortunately damage can occur to components of, e.g., the vehicle grille assembly, the front fascia, and the like necessitating separation of the grille assembly from the front-end module bolster for repair or replacement of the damaged components. Prior art fasteners used to provide a hidden connection between the grille assembly and the front-end module bolster are often not designed to be releasable, again adding difficulty and time to the process of repair/replacement, and potentially requiring replacement also of the fastener.

For this reason it is known to provide alternative fastening systems, many providing a feature of releasability, that do not rely on conventional "hard" fasteners. One such system as described in U.S. Published Patent Appl. No. 2008/0317549 is fabricated from a plastic and includes a substantially quadrangular "doghouse" connected to a front end module of a vehicle (see FIG. 1). The system further includes a cooperating "penetrator" connected to the vehicle grille including an intermediate clip for mating with and engaging the doghouse interior. The system thus presents a solution, but a solution requiring multiple interacting components each adding cost and a potential area of mechanical failure.

To solve this and other problems, the present disclosure relates to a fastener for attaching vehicle components such as grille assemblies and front-end module bolsters to one another. Advantageously, the fastener is simple, robust, and configured for ease of attachment, but is also configured to be releasable in the event that removal of the grille assembly for repair/replacement is necessary during the assembly process.

SUMMARY

In accordance with the purposes and benefits described herein, in one aspect a fastener for connecting a first vehicle module to a second vehicle module is described, the fastener including a body comprising a head having a substantially planar capturing surface configured for releasably engaging a portion of the second vehicle module. The fastener body includes a base configured for attachment to a back of the first vehicle module and a neck extending between the base and the head. The neck may include at least one reinforcing rib structure.

In embodiments, the head defines a hook portion including the capturing surface configured for releasably engaging a cooperating flange disposed on the second vehicle module. The hook portion may further include a cam surface configured for slidingly translating over the cooperating flange. The capturing surface and the cam surface meet to define an acute angle.

In another aspect, a vehicle grille and front end module bolster assembly is provided, including a grille assembly and a front end module bolster attached one to the other by the described fastener.

In the following description, there are shown and described embodiments of the disclosed fastener. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed fastener for releasably engaging vehicle components such as a vehicle grille assembly and a front end module bolster, and together with the description serve to explain certain principles thereof. In the drawing.

Reference will now be made in detail to embodiments of the disclosed fastener, examples of which are illustrated in the accompanying drawing figures.

DETAILED DESCRIPTION

Figure 1:
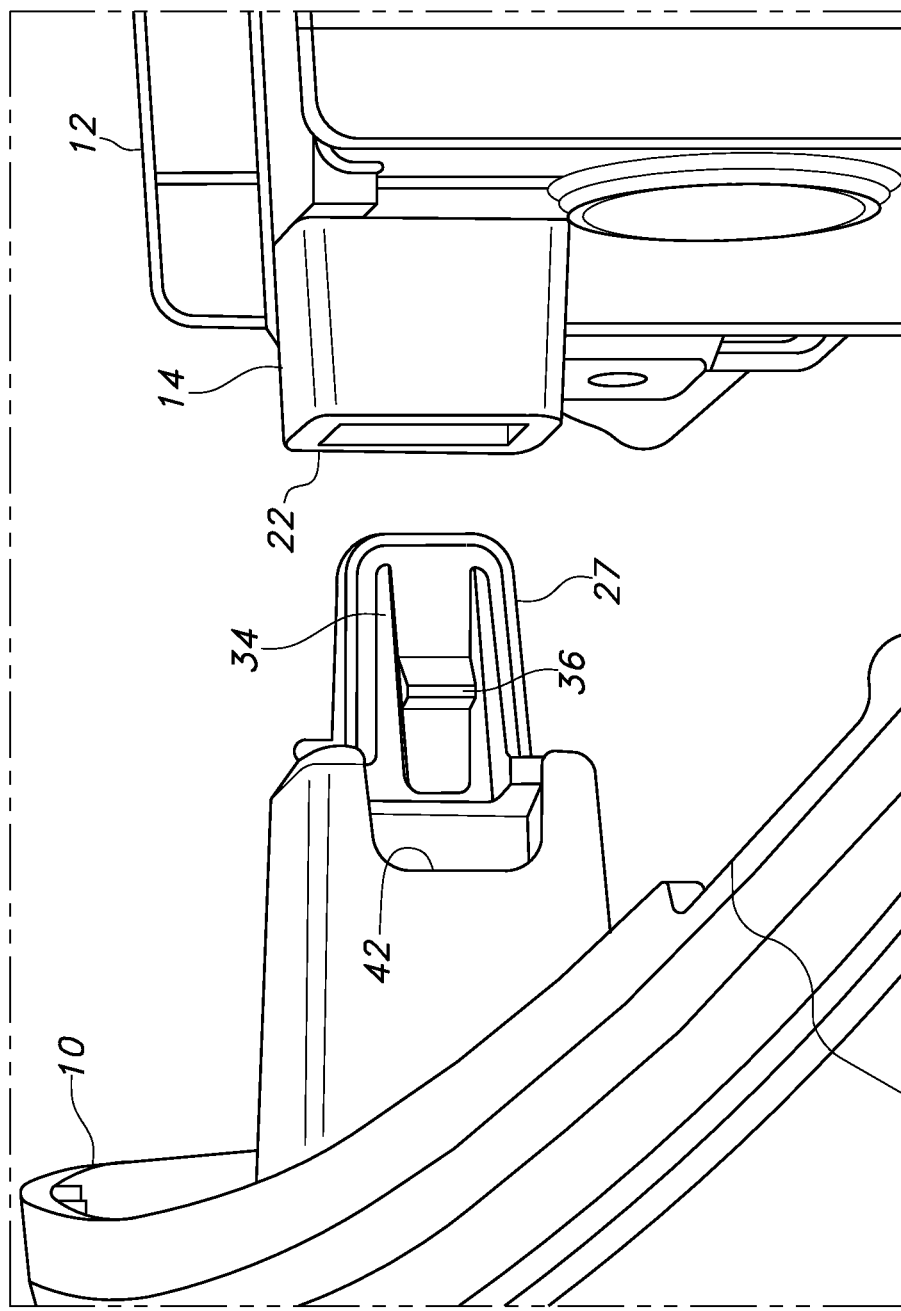
FIG. 1 depicts a prior art fastener for securing a vehicle grille assembly to a front end module bolster.
Figure 2:
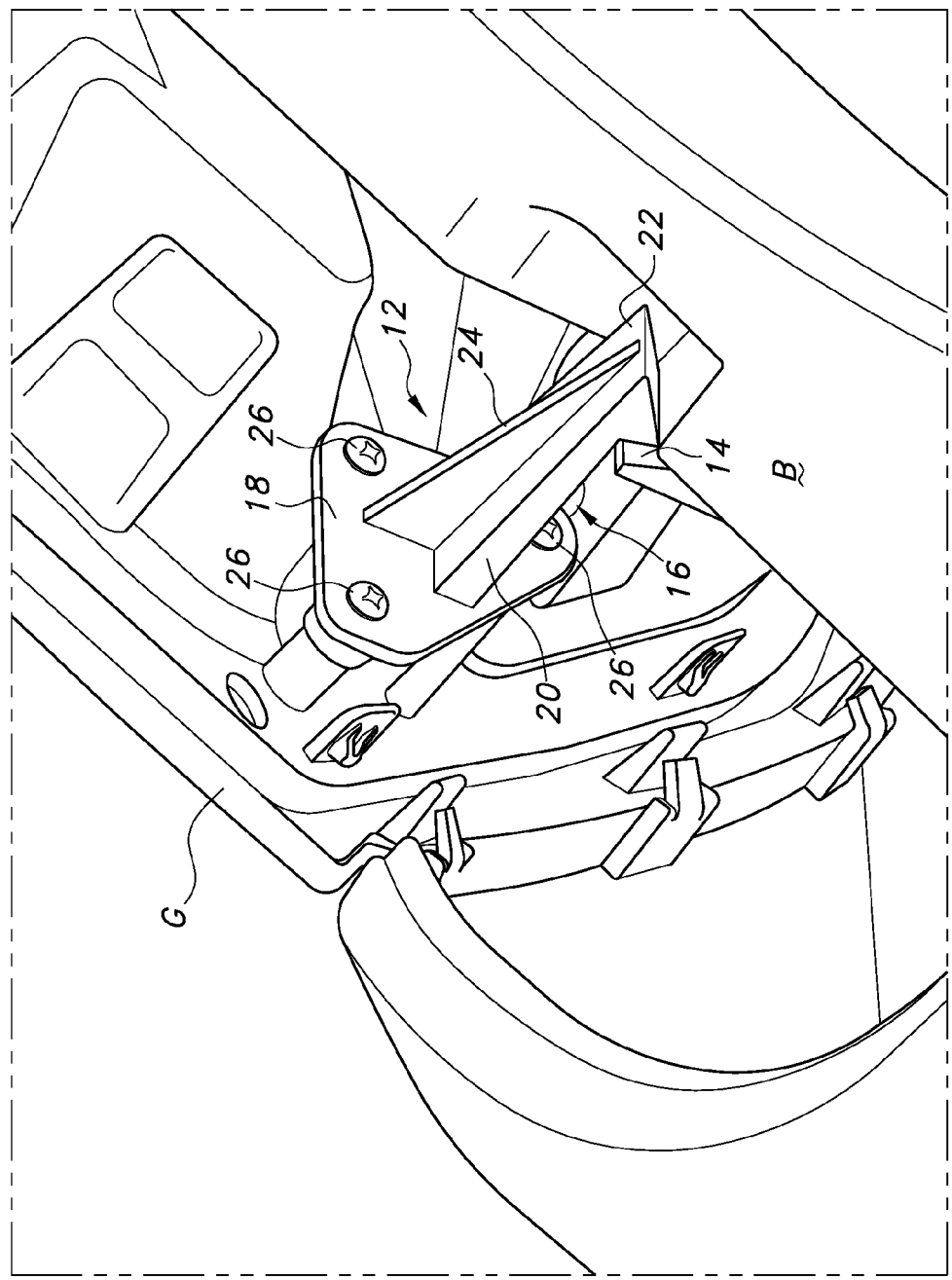
FIG. 2 is a front perspective view of a fastener according to the present disclosure for securing a vehicle grille assembly to a front end module bolster.

With reference to FIG. 2, a fastener 12 according to the present disclosure is shown. As depicted, the fastener 12 is used to attach a portion of a vehicle grille assembly G to a portion of a vehicle front-end module bolster B. In particular, as will be described the fastener 12 is configured to releasably engage a flange 14 defined in a portion of the bolster B.

The fastener 12 is defined by a body 16 defined by a base 18, a neck 20, and a head 22. One or more reinforcing ribs 24 may be included on neck 20 to provide stability to the fastener 12. The base 18 is configured for attachment to a portion of the grille assembly G, such as by self-threading plastic screws 26. Of course, alternative fasteners are suitable and contemplated for use herein.

Figure 3:
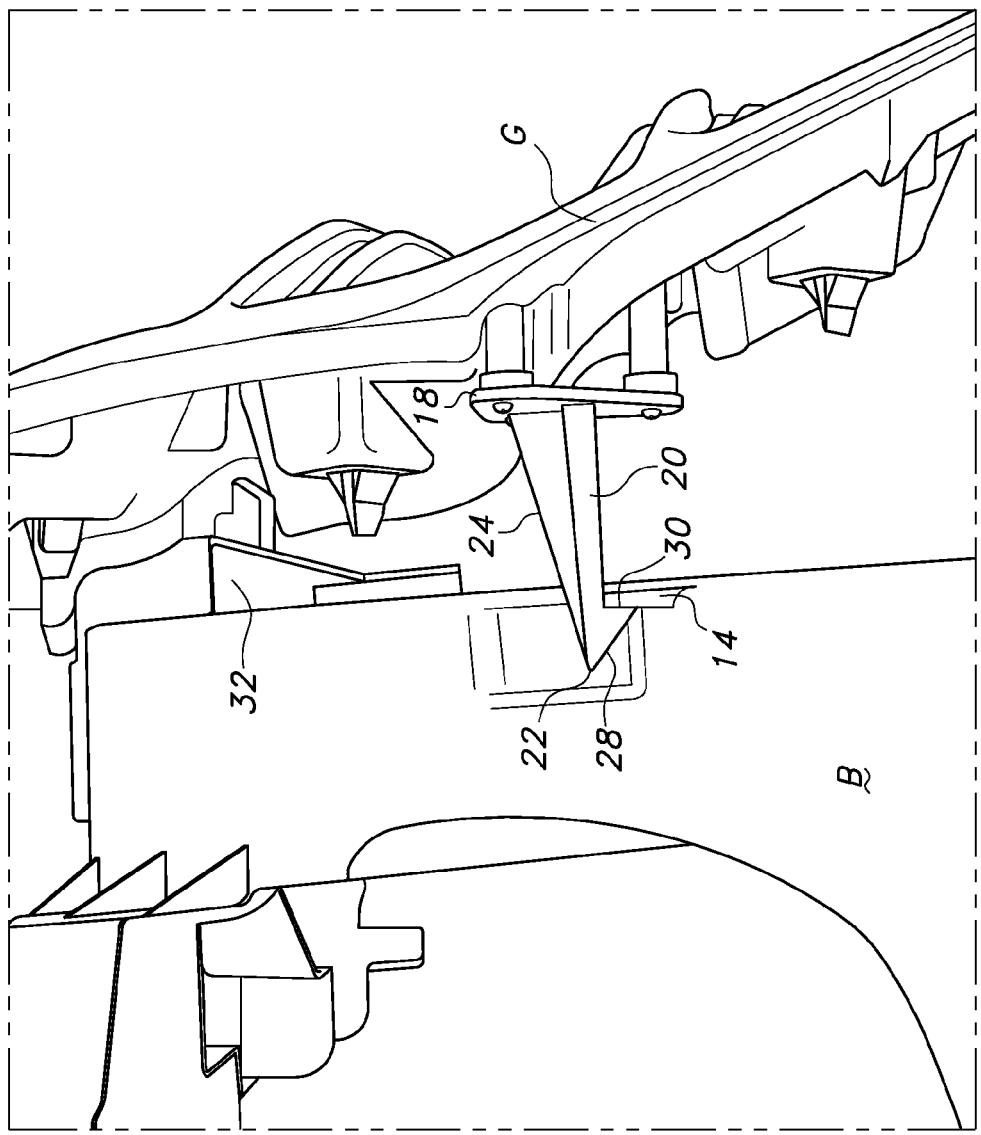
FIG. 3 is a side view of the fastener of FIG. 2.
Figure 4:
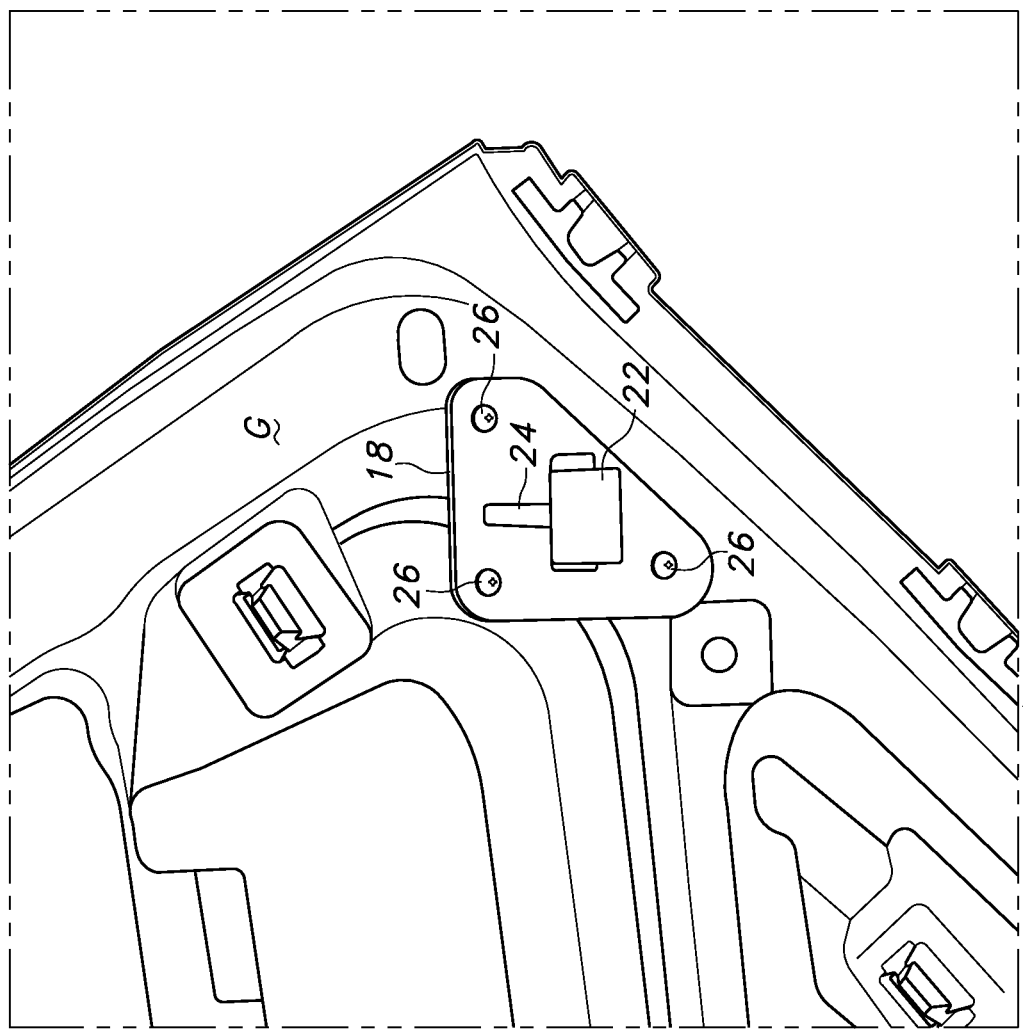
FIG. 4 is a front view of the fastener of FIG. 2.

With particular reference to FIG. 3, the fastener head 22 is defined by a cam surface 28 and a capturing surface 30 defining a substantially planar surface. The cam surface 28 and capturing surface 30 meet at an acute angle. As will be appreciated, the cam surface 28 provides an angled surface which slidingly translates the head 22 over the bolster flange 14 by simply biasing the fastener 12 forwardly. The fastener neck 20 is fabricated of a material that, while providing the required structural strength to secure vehicle components and/or modules together, retains sufficiently flexibility/resiliency to allow this sliding translation. Then, once the fastener 12 has been biased forward sufficiently, the capturing surface 30 can engage a corresponding planar mating surface of the flange 14.

It will be appreciated that fasteners 12 may be provided whereby the head 22 is differently sized such that substantially vertically oriented capturing surface 30 is held at different distances from the fastener base 18 according to need. By this simple expedient, a "tunable" feature is introduced whereby otherwise substantially similarly dimensioned fasteners 12 provide differing fitments between a grille assembly G and a bolster B.

This feature is especially useful in situations where certain components, or even discrete areas of certain components, are required to have a particular tightness or flushness of fit. As one example, many vehicle grille assemblies G define a substantially arcuate front surface, for reasons of aerodynamic profile, aesthetics, and consumer preference. Flushness of fit may be less of an issue towards the central portion of the grille assembly G. However, commonly vehicle components such as headlamp assemblies 32 are disposed at opposed ends or corners of the vehicle front end module bolster B, and are visible through apertures in the grille assembly G. The interface between the headlamp assembly 32 and the grille assembly G is easily controlled using the fastener 12 of this disclosure, by selecting fasteners 12 providing the desired fitment, attaching them to the grille assembly G, and biasing the grille assembly G forwardly whereby the fasteners 12 attach to the bolster flanges 14 as described above.

In this manner, a hidden fastener providing a desired fitment between, for example, a grille assembly G and a bolster F is provided, without requiring significant modifications to the vehicle components, multi-component fasteners, etc. Likewise, because the described fastener 12 is a "soft" fastener, removal and replacement is simplified and less costly in the event of damage to a vehicle component during the assembly process.

Obvious modifications and variations are possible in light of the above teachings. All such modifications and variations are within the scope of the appended claims when interpreted in accordance with the breadth to which they are fairly, legally and equitably entitled.

What is claimed:

1. A fastener for connecting a first vehicle module to a second vehicle module, the fastener including a body comprising a head having a substantially planar capturing surface configured for releasably engaging a portion of the second vehicle module, wherein the body includes a base configured for attachment to a back of the first vehicle module and a neck extending between the base and the head, the fastener further including at least one reinforcing rib structure protruding from the neck.

2. The fastener of claim 1, wherein the head defines a hook portion including the capturing surface configured for releasably engaging a cooperating flange disposed on the second vehicle module.

3. The fastener of claim 2, wherein the hook portion further includes a cam surface configured for slidingly translating over the cooperating flange.

4. The fastener of claim 3, wherein the capturing surface and the cam surface meet to define an acute angle.

5. The fastener of claim 1, wherein the first vehicle component is a grille assembly.

6. The fastener of claim 1, wherein the second vehicle component is a front end module bolster.

7. A vehicle grille and front end module bolster assembly, comprising:
    a grille assembly;
    a front end module bolster; and
    a fastener for releasably securing the grille assembly to the front end module bolster, the fastener comprising a body including at least a base configured for attaching to a back of the grille assembly and a head having a substantially planar capturing surface configured for releasably engaging a portion of the front end module bolster, wherein the fastener body further includes a neck extending between the base and the head and wherein the neck includes at least one reinforcing rib structure protruding from a top surface of the neck.

8. The vehicle grille and front end module bolster assembly of claim 7, wherein the head defines a hook portion including the capturing surface configured for releasably engaging a cooperating flange disposed on the front end module bolster.

9. The vehicle grille and front end module bolster assembly of claim 8, wherein the hook portion further includes a cam surface configured for slidingly translating over the cooperating flange.

10. The vehicle grille and front end module bolster assembly of claim 9, wherein the capturing surface and the cam surface meet to define an acute angle.

11. A vehicle including the vehicle grille and front end module bolster assembly of claim 7.

12. A fastener for connecting a portion of a vehicle grille assembly to a vehicle front end module bolster, the fastener including an L-shaped body comprising a base, a head having a substantially planar capturing surface configured for releasably engaging a cooperating flange disposed on the front end module bolster, and a resilient neck extending between the base and the head, wherein the resilient neck includes at least one reinforcing rib structure tapering from the base to the head.

13. The fastener of claim 12, wherein the base is configured for attachment to a back of the vehicle grille assembly.

14. The fastener of claim 12, wherein the head further includes a cam surface configured for slidingly translating over the cooperating flange.

15. The fastener of claim 14, wherein the substantially planar capturing surface and the cam surface meet to define an acute angle.

* * * * *